United States Patent [19]

Yamada

[11] 4,339,749
[45] Jul. 13, 1982

[54] ABNORMAL CONDITION SENSING MONITOR SYSTEM FOR USE WITH MACHINE TOOLS

[75] Inventor: Shoichi Yamada, Moriguchi, Japan

[73] Assignee: Toyo Tokushu Kiki Co., Ltd., Osaka, Japan

[21] Appl. No.: 165,442

[22] Filed: Jul. 2, 1980

[30] Foreign Application Priority Data

Jul. 3, 1979 [JP] Japan .................................. 54-84654

[51] Int. Cl.³ ............................................. G08B 21/00
[52] U.S. Cl. .................................... 340/680; 340/679; 340/686
[58] Field of Search ........................ 340/680, 686, 679

[56] References Cited

U.S. PATENT DOCUMENTS

| Re. 30,298 | 6/1980 | Keller .................................. 340/680 |
| 3,636,543 | 1/1972 | Maecker .............................. 340/686 |
| 3,962,694 | 6/1976 | Calia et al. ........................... 340/680 |
| 4,023,044 | 5/1977 | Miller et al. ......................... 340/680 |

Primary Examiner—Glen R. Swann, III
Attorney, Agent, or Firm—Sughrue, Mion, Zinn, Macpeak & Seas

[57] ABSTRACT

Disclosed herein is an abnormal condition sensing monitor system for use in conjunction with machine tools, such as automatic press apparatus. Means for sensing an abnormal condition of the machine tool is provided in the vicinity of an essential portion of the machine tool. When a signal indicative of abnormal condition in outputted from the sensing means, a signal processing circuit is actuated. In response to an output obtained from the signal processing circuit, the operation of the machine tool is halted by means of a control circuit or the alarming device, such as lamp, buzzer, is actuated to warn the abnormal condition of the machine tool. Both the control circuit and the alarming device are connected to the signal processing circuit, and either of which are actuated depending upon a level of the signal obtained from the sensing means.

7 Claims, 2 Drawing Figures

ABNORMAL CONDITION SENSING MONITOR SYSTEM FOR USE WITH MACHINE TOOLS

BACKGROUND OF THE INVENTION

This invention relates to a method and apparatus for sensing an abnormal condition of a machine tool.

Machine tools, such as an automatic press apparatus, transfer press, automatic engine lathe or the like, are usually operated at high speed. Therefore, when an abnormal condition occurs in the machine per se or metal molds, products would be defective or the metal molds are liable to be damaged. Particularly, in the case of high speed press processing, damage of the metal molds will result a in large number of defective goods. Unless the abnormal conditions are rectified, the metal molds will be finally cracked or destroyed. As a result, the owner of the machine tool will suffer from great economical loss.

SUMMARY OF THE INVENTION

Accordingly, it is an object of this invention to provide a method and apparatus for sensing abnormal condition of a machine tool, by which production of defective goods is minimized and the destruction of metal molds is prevented.

Briefly, and in accordance with the invention, an abnormal condition occurring during the operation of the machine tool is immediately detected, and upon detection of the abnormal condition the operation of the machine tool is halted and an alarm device is actuated to warn of the abnormal condition of the machine tool. To this effect, means for sensing an abnormal condition of the machine tool is provided in the vicinity of an essential portion of the machine tool. When a signal indicative of abnormal condition is outputted from the sensing means, a signal processing circuit is actuated. In response to an output obtained from the singal processing circuit, the operation of the machine tool is halted by means of a control circuit or the alarming device, such as lamp, buzzer, is actuated to warn the abnormal condition of the machine tool. Both the control circuit and the alarming device are connected to the signal processing circuit, and either of which are actuated depending upon a level of the signal obtained from the sensing means.

DETAILED DESCRIPTION OF THE PREFERRED EMBODIMENT

One embodiment according to this invention will now be described with reference to the accompanying drawings.

Figure 1:
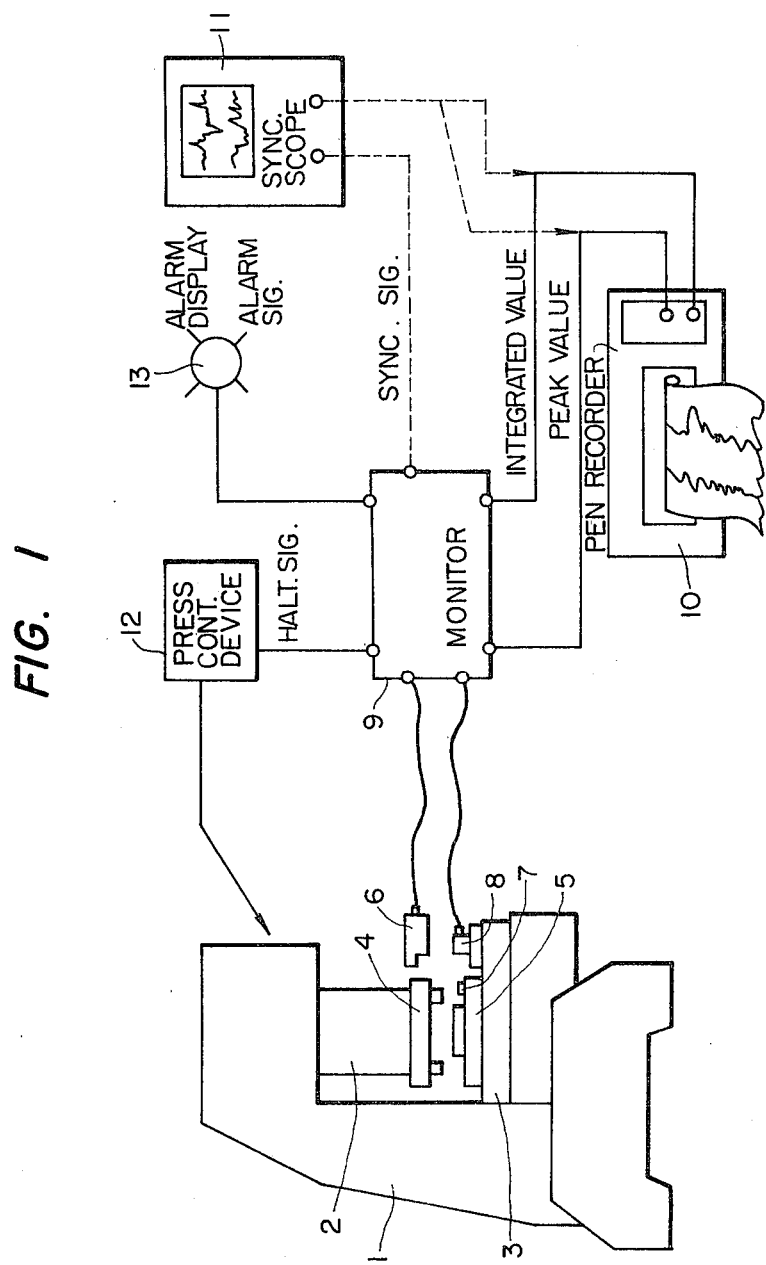
FIG. 1 is a block diagram showing an abnormal condition sensing monitor system including a side view showing an automatic press apparatus.

Referring to FIG. 1, there is shown a block diagram of an abnormal condition sensing monitor system together with a side view of an automatic press apparatus. The automatic press apparatus 1 has a ram 2 reciprocatingly movable in the vertical direction and a bolster 3 provided stationary beneath the ram 2. A male metal mold 4 is attached to the bottom portion of the ram 2 and a female metal mold 5 is secured to the bolster 3.

When the apparatus is driven, the male metal mole 4 is downwardly moved to a predetermined position (lower dead position) by the actuation of the ram 2. In order to sense the lower lower dead position of the male metal mold 4, a position sensor 6, such as proximity switch, and a metal piece 7 are provided in the male and female metal molds 4 and 5, respectively. The metal piece 7 is placed to confront the position sensor 6 with a certain spacing therebetween when the male metal mold 4 is in the lower dead position. In the female metal mold 5, a vibration sensor 8, such as piezoelectric type acceleration sensor, is further provided for sensing the vibration of the female metal mold 5.

Magnetically induced signals are obtained from the position sensor 6 and the vibration sensor 8, which are fed to an abnormal condition sensing monitor 9. An integrated value of the signal obtained from the vibration sensor 8 and a peak value of the signal obtained from the position sensor 6 are outputted in the form of analog signals for each stroke of the ram 2. Such analog signals are applied to a pen recorder 10 where the levels of the analog signals are recorded. The integrated and the peak values thus obtained are stored in a memory contained in the interior of the pen recorder 10 and fed to a synchronizing scope 11 where the integrated and the peak values are displayed by the aid of a synchronizing signal fed from the monitor 9. In FIG. 1, reference numerals 12 and 13 denote a press control device and an alarming device, respectively, which will be described later on.

Figure 2:
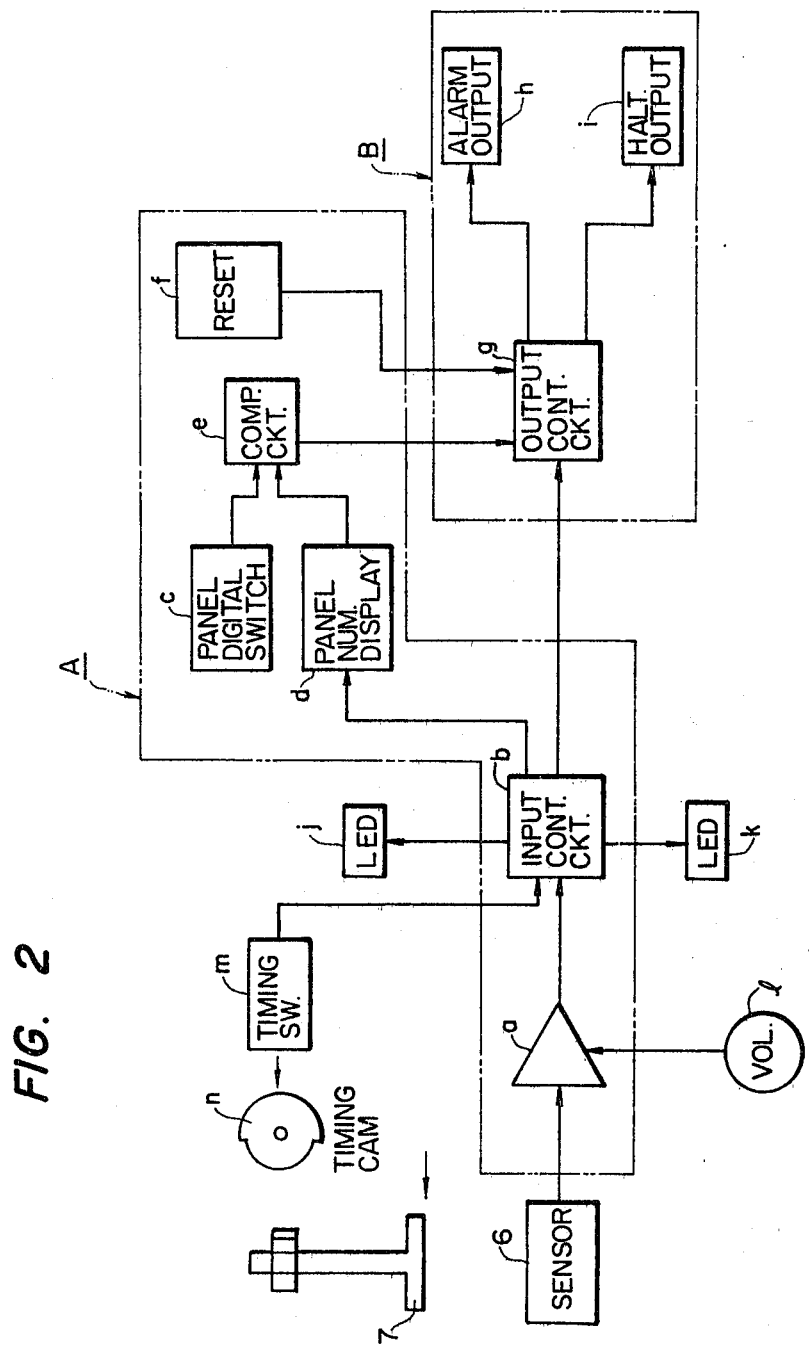
FIG. 2 is a block diagram showing an abnormal sensing monitor shown in FIG. 1.

Referring to FIG. 2, there is shown a block diagram of the abnormal condition sensing monitor 9 in which reference symbol A denotes a signal processing circuit. The signal processing circuit A includes an amplifier a, an input control circuit b, a panel numeral display unit d, a panel digital switch c, a comparison circuit e and a reset circuit f. Reference symbol B denotes an alarming circuit in which an output control circuit g is included. An alarming signal output h and a halt signal output i are outputted from the output control circuit g. In this figure, reference symbols j and k denote LED display devices, both connected to the input control circuit b, l a distance setting volume connected to the amplifier a, m a timing switch, and n denotes a timing cam.

The operation of the abnormal condition sensing monitor system will next be described.

When the press processing operation, such as compressing, bending, cutting, contracting or joining operation, is normally carried out, a constant spacing is maintained between the position sensor 6 and the metal piece 7. In this condition, a signal having a regular waveform is outputted from the position sensor 6.

In the case when an abnormal condition occurs during the press processing caused by, for example, the damage of the male and/or female metal molds 4 and 5, the wear thereof, the pulse signal obtained from the position sensor 6 becomes distorted. In response to such a distorted pulse signal, the signal processing circuit A is actuated. The pulse signal obtained from the position sensor 6 is amplified by the amplifier a and then applied through the input control circuit b to the panel numeral display unit d. The abnormal condition, i.e. the displacement of the male metal mold 4 from the lower dead position, is numerically displayed in a panel of the monitor system by means of the panel numeral display unit d. The output of the panel numeral display unit d and the panel digital switch c are subjected to comparison in the comparison circuit e, the output of which is then applied to the output control circuit g. The output control circuit g provides either the alarming signal output h or the halt signal output i. In response to the alarming signal output h, a lamp or buzzer is actuated, thereby warning the abnormal condition. On the other hand, the halt signal output is applied to the press control device 12 and the operation of the press apparatus 1 is halted in response thereto.

As described above, according to this invention, the abnormal condition occurred during the operation of the machine tool is immediately sensed due to the provision of the position sensor at the side of the movable portion (male metal mold) of the machine tool. Therefore, it is advantageous in that the production of defective goods is reduced at minimum and the destruction of the metal molds is prevented.

Although the invention has been described with respect to specific embodiments, it will be appreciated by one skilled in the art that a variety of changes may be made without departing from the essential scope of the invention.

What is claimed is:

1. A method of sensing an abnormal condition of a machine tool, said machine tool including a movable element reciprocatingly movable between a first and a second position and a stationary element confronting said movable element with a certain spacing therebetween, comprising the steps of: sensing a displacement of said movable element from said first position; providing an output indicative of the displacement thereof; processing by subjecting to comparison the output provided as a result of sensing with a value to selectively generate an alarm signal and a halt signal; and indicating the abnormal condition indicative of the displacement of said movable element by generation of said alarm signal.

2. A method of sensing an abnormal condition of a machine tool, said machine tool including a movable element reciprocatingly movable between a first and a second position and a stationary element confronting said movable element with a certain spacing therebetween, comprising the steps of: sensing a displacement of said movable element from said first position; providing an output indicative of the displacement thereof; processing by subjecting to comparison the output provided as a result of sensing with a value to selectively generate an alarm signal and a halt signal; and halting the movement of said movable element in response to generation of said halt signal.

3. An abnormal condition sensing monitor system for use with a machine tool, said machine tool including a movable element reciprocatingly movable between a first and a second position and a stationary element confronting said movable element with a certain spacing therebetween, comprising: sensing means for sensing a displacement of said movable element from said first position, said sensing means being adapted to provide an output indicative of said displacement; signal processing means for processing said output of said sensing means and comparing said output with a value and selectively generating an alarm signal and a halt signal; means for indicating an abnormal condition indicative of the displacement of said movable element by generating said alarm signal; and halting means for halting the movement of said movable element in response to generating said halt signal.

4. The system as claimed in claim 3 wherein said sensing means comprises a proximity switch and a metal piece, the former being provided in said movable element and the latter being provided in said stationary element.

5. The system as claimed in claim 3 or 4 wherein said signal processing means comprises a comparison circuit for comparing said output of said sensing means with a reference level and an output control circuit for providing said alarm signal and said halt signal in response to an output obtained from said comparison circuit.

6. The system as claimed in claim 3 or 4 wherein said alarming means comprises a lamp.

7. The system as claimed in claim 3 or 4 wherein said alarming means comprises a buzzer.

* * * * *